United States Patent [19]

Shimazaki et al.

[11] 4,046,464
[45] Sept. 6, 1977

[54] EXPOSURE CONTROL SYSTEM AND A MOTION PICTURE CAMERA USING THE SAME

[75] Inventors: Mamoru Shimazaki, Tokyo; Masamichi Toyama, Machida; Toshikazu Ichiyanagi, Tokyo; Hideto Iwama, Kawasaki, all of Japan

[73] Assignee: Canon Kabushiki Kaisha, Tokyo, Japan

[21] Appl. No.: 588,896

[22] Filed: June 20, 1975

[30] Foreign Application Priority Data

June 25, 1974 Japan .................. 49-72656
June 25, 1974 Japan .................. 49-72657
July 23, 1974 Japan .................. 49-84433
Apr. 25, 1975 Japan .................. 50-50475

[51] Int. Cl.² .................. G03B 7/08; G03B 21/38
[52] U.S. Cl. .................. 352/141; 352/169; 352/174; 354/38; 354/254
[58] Field of Search .................. 354/38, 254; 352/121, 352/169, 170, 180, 174, 175, 178, 179, 141

[56] References Cited

U.S. PATENT DOCUMENTS

| | | | |
|---|---|---|---|
| 3,603,678 | 9/1971 | Anderl et al. | 352/169 |
| 3,705,764 | 12/1972 | Reinsch | 352/121 |
| 3,753,613 | 8/1973 | Reinsch et al. | 352/121 |
| 3,767,298 | 10/1973 | Reinsch | 352/169 |
| 3,825,329 | 7/1974 | Heinrich et al. | 352/180 |
| 3,882,511 | 5/1975 | Tsujimoto et al. | 354/38 |
| 3,898,000 | 8/1975 | Kobayashi et al. | 352/121 |
| 3,964,080 | 6/1976 | Maida | 352/121 |
| 3,971,053 | 7/1976 | Maida | 352/121 |
| 3,980,400 | 9/1976 | Maida | 352/121 |
| B 349,177 | 1/1975 | Iwai et al. | 352/169 |

Primary Examiner—Russell E. Adams
Attorney, Agent, or Firm—Toren, McGeady and Stanger

[57] ABSTRACT

An automatic exposure control system for controlling the diaphragm of a motion picture camera in accordance with the object brightness level photoelectrically determined from the amount of light passing through the diaphragm is provided with a manually switchable shutter control device having a number of switched positions including positions for selection of various speeds of rotation of the camera shutter and for selection of various shutter intervals each effected in one revolution of the shutter in combination with a corresponding number of branch circuits of the exposure metering device controlling operation of the camera diaphragm, whereby it is made possible to make exposures not only at normal light levels but also at low light levels outside the lower limit of the normal light level range.

11 Claims, 14 Drawing Figures

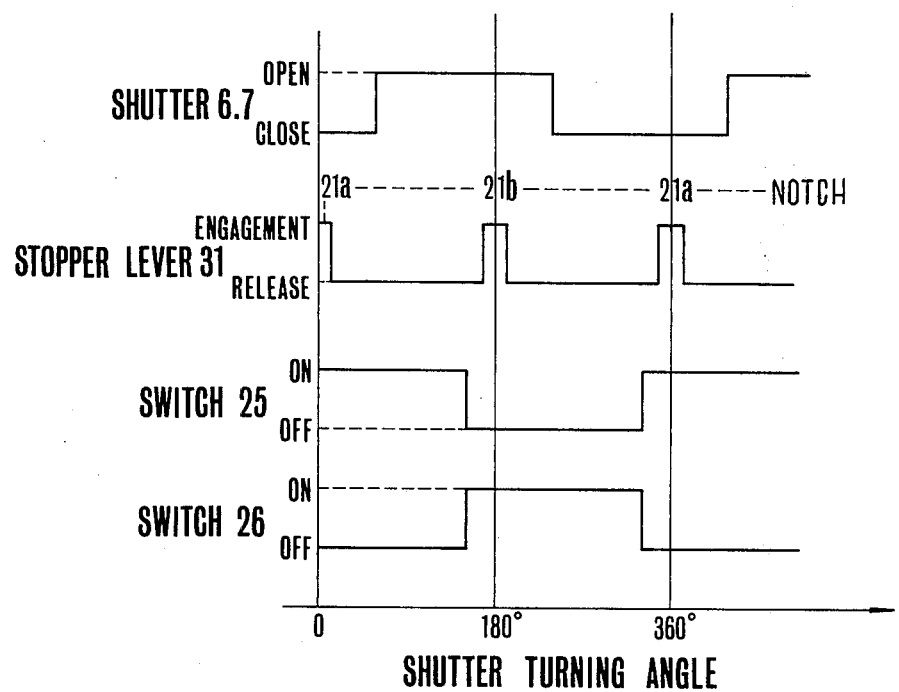

EXPOSURE CONTROL SYSTEM AND A MOTION PICTURE CAMERA USING THE SAME

BACKGROUND OF THE INVENTION

1. Field of the Invention

This invention relates to an exposure control system and a motion picture camera using the same.

2. Description of the Prior Art

The prior art has proposed two systems for controlling the exposure of a motion picture camera adapted to make exposures not only at normal light levels but also at light levels outside the normal light range, and particularly of a motion picture camera adapted to make exposures even at low light levels. According to one system, the exposure control is made by manually adjusting the angular positions of one of the paired shutter blades relative to the other and the diaphragm means defining the size of the aperture opening through which an image forming light beam passes. According to another system, after the camera diaphragm is adjusted to a predetermined setting, the exposure time interval is controlled by varying the speed of rotation of the shutter in conformance with the preselected aperture value. These prior art systems, however, have various problems. In the case of the former system, because of the incapability of automatic exposure control, the photographer has to manually control the size or angle of an opening defined by the shutter blades in accordance with the object brightness level. When fast changes in light conditions occur in the scene being photographed, or when the camera is rapidly aligned from one object to another with a change in brightness level, the necessary manipulation of the camera becomes very troublesome or almost impossible. Another problem is that the quality of reproduced motion pictures or photographs is often dependent upon the ability of the photographer to evaluate the light conditions or object brightness levels. Still another problem arising from the particular shutter structure is that the range of available exposure intervals is relatively limited, depending upon the range of adjustment of the angular positions of the shutter blades because of an assurance that the shutter serves to completely block the path of an image forming light passing through the maximum size of the diaphragm aperture. A furthermore problem is that the shutter must be provided with mechanical adjusting means for adjusting the angular positions of the shutter blades for the purpose of utilizing the shutter as the exposure time control means, the provision of such adjusting means making the camera structures complicated. This complexity will in turn cause an increase in dimensions of the camera body and the probability of occurrence of mechanical damages. As is known in the art, recently the requirements for minimization of the weight and bulk of the camera and for the reduction of the production cost become of more and more importance from the multipurpose camera systematization view point. Under such a situation, it is of ever-increasing necessity to construct the camera body with an automatic exposure control apparatus in mechanically simple form by use of a reasonable electrical circuitry.

In the case of the latter exposure control system, the speed of rotation of the shutter is varied with variation of light condition in the scene being photographed, or with variation of object brightness level as the camera is aligned from one to another object of different brightness whereby the time-spaced relation between the successive exposures is made quite uncertain. This is not suited for the availability of accurate recording data. Further, when the camera is switched to the normal operation position, the shutter is rendered operative only at a preselected rotation speed. With the latter system, therefore, it is often possible to overlook a necessary manipulation when switching the camera between the normal and low light level exposure control ranges.

It is also known in the art to provide motion picture cameras of the type in which the shutter and film transport mechanisms are driven by a single small electric motor and are braked in such a manner that, upon release of the shutter actuation member, the power supply circuit for the motor is opened and then the shutter stopping member is brought into engagement with the control shaft being driven by the motor, whereby the shutter is held from rotation in an angular position. With such a driving and braking mechanism, however, it is often possible to stop the shutter blade in an aperture-unblocking position because the shutter driving motor continues to rotate under the action of only its inertia after the supply circuit is opened. In such a case, a so-called "blank frame" is produced.

SUMMARY OF THE INVENTION

A first object of the present invention is to provide a novel exposure control system applicable to the above mentioned type motion picture camera with slight modification and to provide a motion picture camera employing the same and which has overcome the above mentioned conventional drawbacks.

A second object of the present invention is to provide an exposure control system for use in a motion picture camera and which enables the camera to make exposures at normal light levels as well as at light levels outside the normal light level range in the shutter speed preselection exposure control mode independently of whether or not the actual light level is in the normal light level range, while permitting the camera to operate either for motion picture photography or for still photography in automatic response to an extended range of scene brightness levels, and to provide a camera using the same.

A third object of the present invention is to provide an exposure control system for use in a motion picture camera in which there is provided operating means for selection of shutter speeds, some of which are adapted for use in making exposures at normal light levels and the other of which are adapted for use in making exposures particularly at low light levels, control means for controlling operation of a shutter driving motor in response to the setting of said operating means and diaphragm control means responsive both to the shutter speed selected by said operating means and to the level of brightness of an object being photographed for controlling the size of the aperture opening of the lens diaphragm of the camera, thereby it being made possible to make exposures in the shutter speed preselection exposure control mode independently of whether or not the actual light level is in the normal light level range, and to provide a camera employing the same.

A fourth object of the present invention is to provide an exposure control system for a motion picture camera in which there is provided a manually switchable shutter control device having a number of switched positions including positions for selection of various speeds of rotation of the shutter and for selection of various shutter intervals each effected in one revolution of the shutter in combination with a corresponding number of branch circuits of the exposure metering device controlling operation of the camera diaphragm, whereby it being made possible to make exposures either for motion picture photography or for still photography under a wide variety of exposure conditions, and to provide a camera employing the same.

A fifth object of the present invention is to provide an exposure control apparatus for a motion picture camera having a shutter, a driving circuit for the driving means of said shutter and an exposure metering device, which apparatus includes shutter speed setting means having a number of settable positions, some of which are adapted for use in making exposures at normal light levels and the other of which are adapted for use in making exposures at low light levels, timing means arranged to be rendered operative when said shutter speed setting means is set in one of the low light level exposure positions, control means cooperating with said timing means for controlling actuation of said shutter driving circuit, for revolution in one cycle and a number of branch circuits corresponding to the number of settable shutter speed positions and associated with said exposure metering device for adaption to the respective shutter speeds, whereby the diaphragm of the camera is controlled in accordance with the preselected shutter speed and the light level as sensed by said exposure metering device over the extended range of light levels.

The term "light level" herein used is related to an exposure value in terms of $2EV = F^2/T$, wherein $F$ is the aperture value and $T$ is the reciprocal number of the shutter speed. The normal light level range for motion picture cameras and that for still cameras are generally defined as follows.

|  | Still camera | Motion picture camera |
| --- | --- | --- |
| EV | 3.5 – 17 | 7.1 – 16.4 |
| F | F 1.7 – 16 | F 1.8 – 32 |
| Shutter speed (1/T value) | ½ – 1/500 second | 18 – 36 frames/sec. (1/43 – 1/86 second) |

Other objects and features of the present invention will become apparent from the following detailed description taken in conjunction with the accompanying drawings in which:

BRIEF DESCRIPTION OF THE DRAWINGS

FIG. 1B is a timing chart showing operation of the shutter driving and stopping mechanism of FIG. 1A with respect to the opening and closing movement of the camera shutter.

DETAILED DESCRIPTION OF THE PREFERRED EMBODIMENTS

Figure 1A:
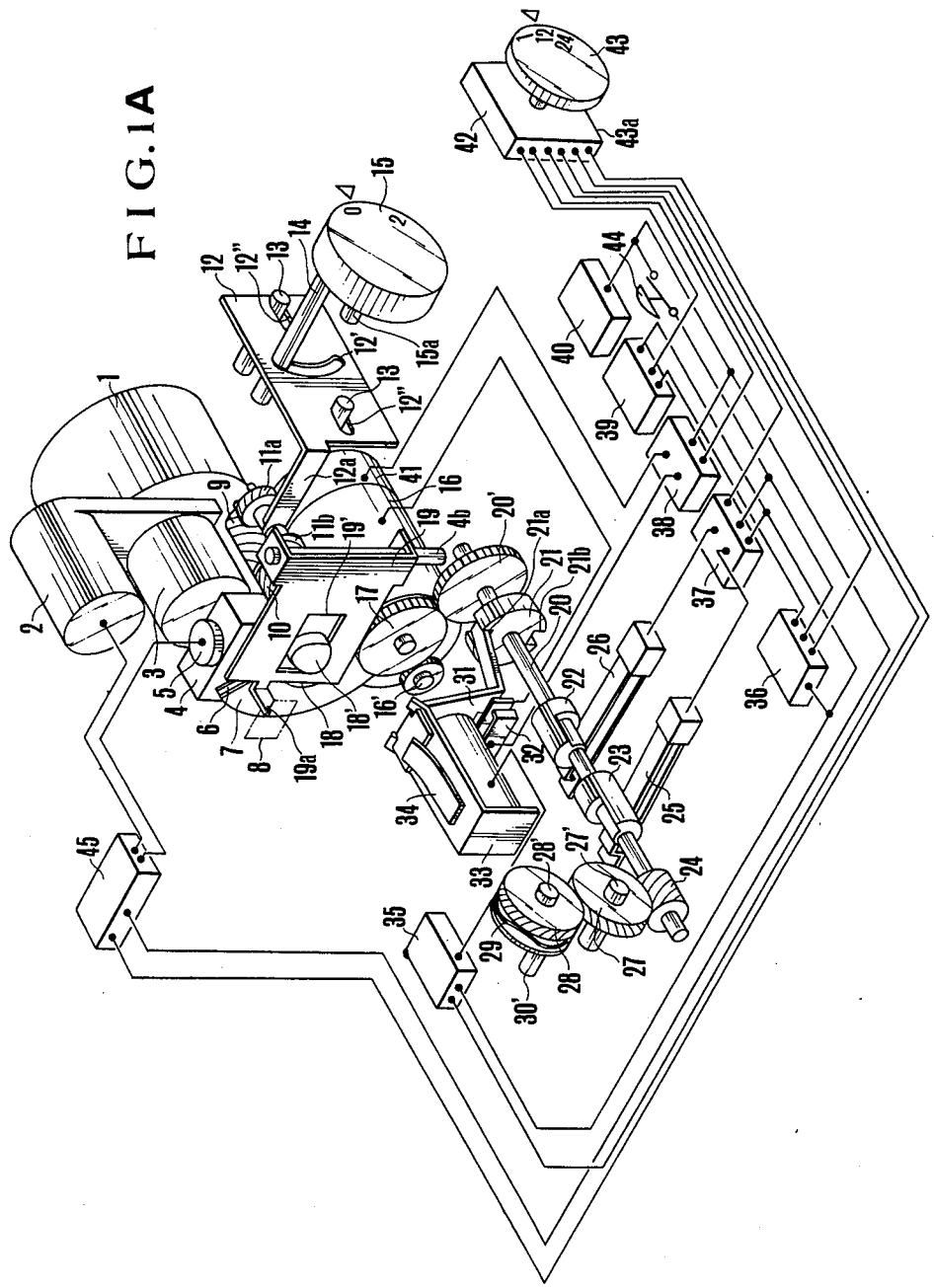
FIG. 1A is an exploded perspective view of the basic parts of one embodiment of a motion picture camera employing an exposure control system according to the present invention.

Referring now to FIG. 1A, there is shown the essential parts of a motion picture camera with an objective lens comprising a front lens assembly 1 and a rear lens assembly 3 between which is positioned an electrical motor operating diaphragm device 2 to control the amount of light passing through the objective lens 1 and 3. The diaphragm device may be constructed as defining a variable aperture opening by means of diaphragm blades, or as varying the transmittance by means of a liquid crystal with application of a voltage thereon. Positioned behind the objective lens 1, 3 is a beam splitter 4 to split off a fraction of the light entering through the objective 1, 3 toward a light value sensing element 5 such as a Cadmium sulfide photocell capable of producing an electrical signal with magnitude proportional to the amount of light received, the other fraction of the light being permitted to reach a film gate 8 when a rotary shutter comprising a pair of shutter blades 6 and 7 arranged between the beam splitter 4 and the film gate 8 is in its unblocking position. The shutter is provided with an open cutout angle adjusting mechanism arranged to adjust the degree of angle of the open cutout defined by the shutter blades 6 and 7 independently of the motion of the shutter driving mechanism to be described later. The shutter open cutout angle adjusting mechanism comprises a first helical gear 9 coaxially affixed to the first shutter blade 7, a second helical gear 10 coaxially affixed to the second shutter blade 6 and having a supplementary helix angle to that of the first helical gear 9, the first and second helical gears 9 and 10 being coaxially aligned with each other on a common axis, and first and second helical pinions 11a and 11b engaging with the first and second helical gears 9 and 10 respectively and fixedly mounted on a rotatable and slidable common shaft parallel to the gear axis. In order to move the helical pinion assembly 11 longitudinally while varying the degree of angle of the shutter open cutout, there is provided a slide 12 having two longitudinally elongated slots 12" in parallel to the helical pinion axis in which respective pins 13 affixed to the camera housing are slidably engaged, and having an arcuate slot 12' in which an eccentric pin 14 extending from a dial 15 which is accessible from the outside of the camera is engaged so that upon rotation of dial 15, the slide 12 is longitudinally moved while varying the axial position of the helical pinion assembly 11 through a projection 12a-and-pinion 11 shaft connection.

The shutter driving mechanism comprises an electric motor 16, and a gear train comprising a pinion 16' mounted on the output shaft of the motor 16, an intermediate gear 17 engaging the pinion 16', and a terminal gear 18 engaging the intermediate gear 17 and fixedly mounted on a driving shaft for the shutter blades. The driving shaft also fixedly carries a triangular cam linkage 18' cooperating with a film pull down plate 19 in engagement with a rectangular opening 19' thereof. The film pull down plate is pivotally slidably mounted on a shaft 46 affixed to the camera housing, and has a claw 19a arranged so that when the cam disk 18' is driven from motor 16, the claw 19a enters into one of the perforations of a film not shown behind the film gate 8 and then draws the film downwardly past the film gate through the space of one frame and thereafter the claw is withdrawn from the film and returns to the initial position leaving the film stationary each time the pull down plate 19 reciprocates through a complete cycle synchronized with one cycle of shutter revolution. In order to transmit the motion of motor 16 to a film transport or winding mechanism, there is provided a shaft 20 having a gear 20' mounted at one end thereof, the opposite end of which fixedly carries a worm gear 24 engaging an idler gear 27 rotatably mounted on a shaft 27. The idler gear 27 engages a film take up reel driving gear 28 rotatably mounted on a shaft 28' and drivingly connected through a frictional clutch or spring 29 to an adapter 30 having a pin 30' arranged to be brought into engagement with a rib of the core of the film take up reel not shown when the film take up reel is loaded into the camera.

The provision for controlling the angular position or the shutter blades 6 and 7 between the closed and fully open positions is made at a mechanism comprising a cam disk 21 fixedly mounted on the motion transmitting shaft 20 and having two peripheral notches 21a and 21b angularly spaced from each other by an angular distance of 180°, the positions of notches 21a and 21b corresponding to the closed and fully open positions of the shutter respectively. In order to achieve this correspondence, a gear having the same gear tooth dimensions and number as those of the shutter driving gear 18 must be selected for employment as the gear 20. In other words, each time the shutter blades 6 and 7 revolute through complete one cycle, the cam disk 21 rotates through exactly one revolution. Cooperating with the angular position control cam disk 21, a cam follower in the form of a lever 31 pivoted at one edge of the casing for the solenoid of an electromagnet 33 is biased by a spring 34 which tends to urge the lever end 31 for engagement with the cam disk 21. In order to control the period of energization of the solenoid of the electromagnet 33 in timed relation to the movement of the shutter, there is provided a mechanical switch arrangement comprising first and second cam collars 22 and 23 fixedly mounted on the motion transmitting shaft 20 and two switches 26 and 25 having movable contacts arranged to cooperate with the first and second cam collars 22 and 23 respectively. The cam collars 22 and 23 are so oriented with respect to each other that when the switch 26 is closed by the cam collar 22, the switch 25 is open, and the vice versa. The closing and opening operation of the switch arrangement is diagrammatically shown in FIG. 1B in connection with the closing and opening movement of the shutter blades 6 and 7 and the engaging and disengaging movement of the cam follower lever 31 with the notches 21a and 21b of control cam disk 21.

The motion picture camera is further provided with a camera control dial 43 arranged to be manually operable from the outside of the camera housing and having a plurality of switched positions including positions for adaption to particular speeds of rotation of the shutter corresponding to 18 frames/sec., 24 frames/sec., for example, a position for a single frame exposure, and positions for adaptation to particular shutter intervals, e.g., 15 seconds, 30 seconds, and 50 seconds, each being effected in one revolution of the shutter, which may be used in making exposures at low light levels outside the normal light level range. This dial 43 is connected through a shaft 43a to a rotary switch assembly 42 having a number of circuit transfer switches associated with respective blocks 35, 36, 37, 38, 39 and 45, and arranged to be operated in synchronously stepping relation with one another. The block 35 serves as means for controlling the period of actuation of the solenoid 33 when the motor 16 is driven at a speed of rotation for motion picture photography, block 36 as means for selecting either of blocks 35 and 39 for connection to the solenoid of the electromagnet 33, block 37 as means for selecting either of the closed or open positions of the shutter when the shutter is stopped, block 38 as means for maintaining constant the speed of rotation of the motor 16 selected by block 35, block 39 as means for controlling the period of actuation of the solenoid 33 when the motor 16 is driven for only one revolution of the shutter for still photography, and block 45 as means for controlling the lens diaphragm in accordance with the light level as sensed by the light value sensing element 5. Blocks 36 and 37 are supplied with electrical energy from a power source 40 through a closed release switch 44, and blocks 38 and 45 are supplied with electrical energy directly therefrom. The motor 16 is supplied with electrical energy from block 40 through block 38 and a switch 32 positioned adjacent the follower lever 31, so that when the lever 31 is attracted by the electromagnet 33, switch 32 is closed to energize motor 16. These blocks constitute an automatic exposure control system of the invention.

The operation of the motion picture camera of FIG. 1A is as follows.

Motion picture photography: The photographer may turn the dial 43 to select a desired frame frequency, for example, 18 frames/sec. The various mechanisms of the camera are now assumed to be in the illustrated position where the shutter blades are in the closed position as the lever 31 is engaged in the notch 21a of the control cam disk 21, and the shutter open position control switch 25 is in the closed position while the shutter closed position control switch 26 is in the open position. It is to be noted that in the case of motion picture photography with a shutter speed of 18 frames/sec., or 24 frame/sec., the operation of switch 25 has no effect on the control of energization of the solenoid 33.

When the shutter release button or switch 44 is closed, the solenoid is energized from the power source 40 through blocks 36 and 35, thereby the lever 31 is attracted against the force of spring 34, being disengaged from the notch 21a of control cam disk 21 to permit rotation of the motion transmitting shaft 20. Such a pivoting movement of lever 31 caused by the attraction results in closure of switch 32 which in turn causes energization of motor 16. As the motor 16 rotates, the film pull down claw 19a intermittently advances the film past the exposure aperture, while being driven by motor 16 through the gear trains 16', 17 and 18 and through the cam 18'-and-opening 19' connection. The speed of rotation of motor 16 is detected by means of a tachometer, or governor of which the output is feedbacked to the speed adjusting means in block 38 to maintain constant the actual speed of motor 16. Each time a film frame is left stationary behind the film gate 8 as the claw 19a is returned from the advanced position to the initial position for the second half cycle of claw operation, the open shutter cutout of which the angular size was previously adjusted by manipulation of the knob 15 passes in front of the film gate, thereby the frame behind the exposure aperture is exposed to the light entering through the objective lens 1 and 3 in a time interval corresponding to the frequency, i.e., 18 frames/sec., while the size or transmittance of the aperture opening of the diaphragm means 2 is controlled in accordance with the shutter speed and the level of brightness of a scene being photographed as sensed by the photosensitive element 5.

Although a cycle of closing and opening operation of the cam collar 22 for switch 26 repeats itself as the shaft 20 rotates, the solenoid of electromagnet 33 is continuously energized from the power source 40 through block 36 so long as the release switch 44 is closed. When the release switch 44 is opened, however, the solenoid 33 is energized through switch 26 alone. Now assuming that at the moment the release switch 44 is opened, the cam follower end of lever 31 is brought into abutment with the rear side of cam disk 21 at a location in a first region from the shutter closing control notch 21a to the shutter opening control notch 21b, the first region including notch 21a but excluding notch 21b, as viewed in the opposite direction to that in which the disk 21 rotates, the switch control collar 22 assumes a position where the switch 26 is opened to deenergize the solenoid 33, so that when the notch 21a comes into alignment with the lever end 31, the lever end 31 enters the notch 21a under action of spring 34 to stop the shaft 20 from rotation, thereupon switch 32 is opened to deenergize motor 16, and the shutter is held in the closed position. Conversely assuming that at the moment the release switch 44 is opened, the cam follower end of lever 31 is brought into abutment with the rear side of cam disk 21 at a location in a second region from notch 21b to notch 21a, the second region including notch 21b but excluding notch 21a, as viewed in the opposite direction to that in which the disk 21 rotates, collar 22 assumes a position where the switch 26 is closed to energize the solenoid 33, so that even when notch 21b comes into alignment with the lever end 31, the lever end 31 is prevent from entering notch 21b as the lever 31 is attracted by the energized solenoid 33 against the force of spring 34. It is to be understood that the provision of the mechanism for controlling the angular position of the shutter between the closed and opened positions insures that the shutter is always stopped in the closed position when the camera is set for motion picture photography.

Still photography: In order to make exposures at low light levels outside the normal light level range, the photographer turns dial 43 to place a graduation representing a desired shutter speed, for example, 30 seconds in registry with a stationary index, thereby the shutter position selecting means in block 37 cuts off the signal from switch 26 and instead accepts the signal from switch 25. At the same time, the low light level exposure time control means or timing means in block 39 is adjusted to a setting corresponding the selected shutter speed.

When the shutter release button or switch 44 is closed, a voltage is applied from the power source 40 through block 36 to block 35 and also to block 39, thereby the solenoid 33 and timing means are simultaneously actuated. As the solenoid 33 is energized, the lever 31 is attracted being disengaged from notch 21a, and then switch 32 is closed to energize motor 16. As shown in FIG. 1B, just after notch 21a is displaced from alignment with the lever end 31, and so long as the lever end 31 is located in the first region on the rear side of cam disk 21, the collar 23 assumes a position where switch 25 is opened, so that the solenoid 33 is deenergized permitting the lever end 31 to enter the next notch 21b under the action of spring 34, thereby the shutter is opened to initiate an exposure. Upon termination of duration of an exposure interval determined by the timing means in block 39, the timing means produces an output which is applied to block 35, thereupon the solenoid 33 is instantaneously energized to disengage the lever end 31 from notch 21b and then to close switch 32, causing the shutter to move from the open position to the closed position to terminate the exposure. It is now to be noted that as soon as the lever end 31 is displaced from alignment with the notch 21b, the collar 23 closes switch 25 until the next notch 21a moves beyond the alignment with the lever end 31. Therefore, so long as the shutter release switch 44 is closed, a number of exposures with the selected shutter speed, e.g., 30 seconds are made in sequence. But when the shutter release switch 44 is opened just after its actuation, only one frame exposure is made.

Figure 2:
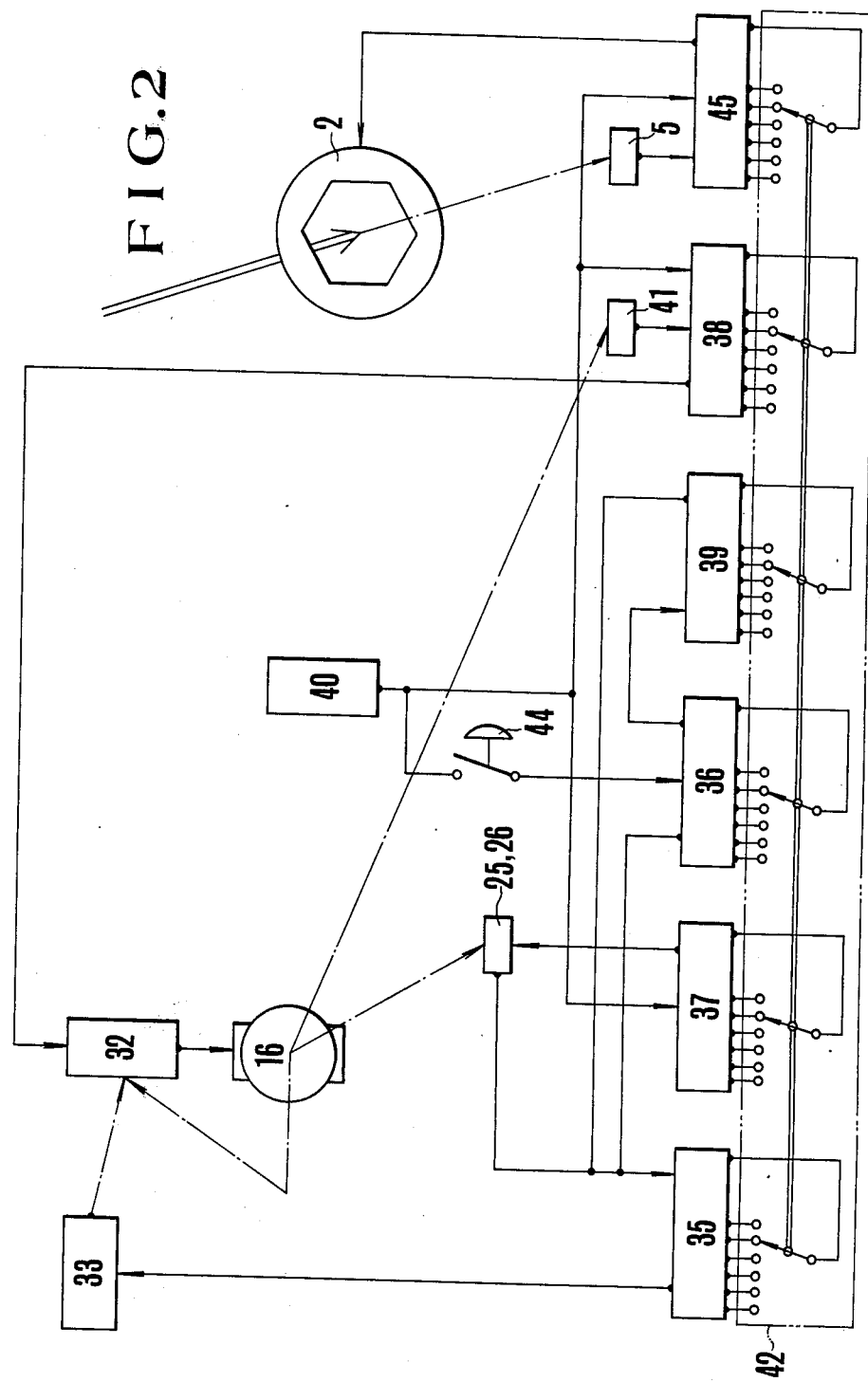
FIG. 2 is a schematic block diagram of the exposure control system of the invention used in the motion picture camera of FIG. 1A.

FIG. 2 shows a block diagram of various parts of an exposure control system embodying the present invention used in the motion picture camera of FIG. 1A, wherein the same numerals have been employed to denote similar parts as those shown in FIG. 1A, and the direction of transmission of signals between the connected parts are indicated by respective arrows. The D.C. input power is fed from a power supply source 40 to each of a shutter stopping position control circuit 37, motor speed adjusting circuit 38 and diaphragm control circuit 45 independently of whether or not the shutter release switch 44 is closed. A voltage is applied through the closed release switch 44 to an input of an exposure control mode selector circuit 36 having two output terminals, one of which is connected to an input terminal of a solenoid control circuit 35, and the other of which is connected to an input terminal of a timing circuit 39. As output terminal of timing circuit 39 is connected to the input terminal of the solenoid control circuit 35 to which is also connected an output terminal of the shutter stopping position control circuit 37 through the one of opposedly operating switches 25 and 26 which is selected in a manner similar to that shown in connection with FIG. 1B. Responsive to any one of three signals from the exposure control mode selector circuit 36, the timing circuit 39 and the switch 25 or 26, the solenoid control circuit 35 produces an output which is applied to the solenoid of an electromagnet 33 cooperating with the cam follower lever 31 for controlling operation of a switch 32. The D.C. power is fed from the power source 40 to a motor 16 through the closed switch 32 and a motor speed adjusting circuit 38. The speed of rotation of the motor 16 is detected by a detector 41 of which the output is applied to an input of the speed adjusting circuit 38. The diaphragm control circuit 45 has an input terminal connected to the output terminal of a light value sensing element 5 and an output terminal connected to an input terminal of driving means including a meter or motor for the lens diaphragm of the camera, thereby the size of the aperture opening of the diaphragm is controlled in accordance with the selected shutter speed, film speed and the level of brightness of a scene being photographed. A block 42 enclosed by dot-and-dash lines is shown as having six transfer switches each having six switchable positions connected to respective blocks 35, 36, 37, 38, 39 and 45 and arranged upon one-step operation of a rotary switch control dial 43 of FIG. 1A to be operated in synchronous one-step switched relation with one another. Each of the circuit transfer switches includes positions for adaptation to motion picture photography at normal light levels and positions for adaptation to still photography at low light levels outside the normal light level ranged defined in the table mentioned before.

Figure 3:
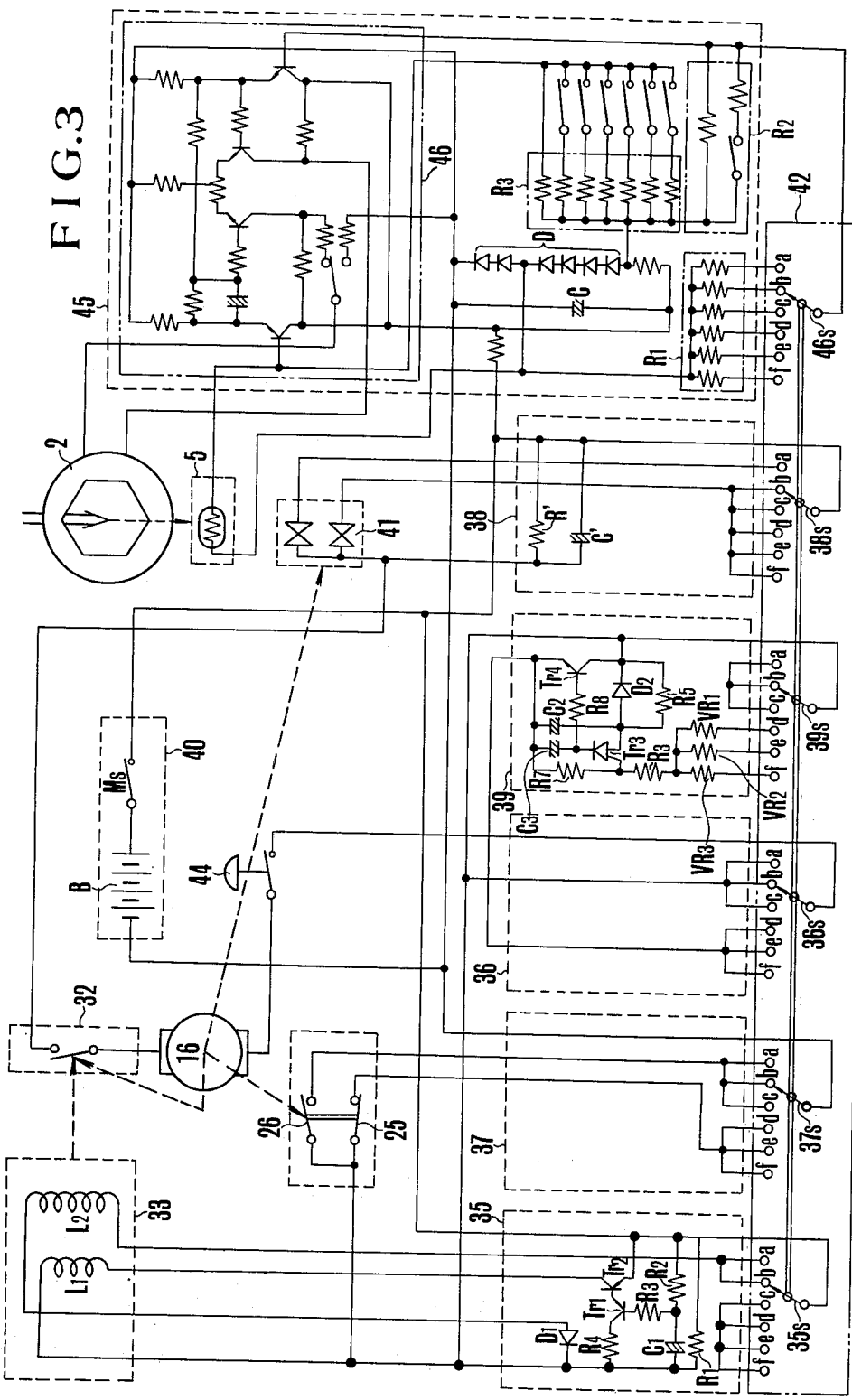
FIG. 3 is a schematic electrical circuit diagram showing the details of the blocks of FIG. 2.

Referring now to FIG. 3, there is shown a specific example of the electrical circuitry of the exposure control system of FIG. 2, wherein the same numerals have been employed to denote similar parts to those shown in FIG. 2, and FIG. 1A. Each of the six circuit transfer switches in the block 42 enclosed by dot-and-dash lines has six switchable positions designated by $a$, $b$, $c$, $d$, $e$ and $f$ corresponding to shutter speed settings of the manually operable camera control dial 43 respectively representing 24 frames/sec., 18 frames/sec. single frame exposure, 15 seconds, 30 seconds and 60 seconds, for example. The electromagnet 33 has a first solenoid $L_1$ of a relatively large number of turns and a second solenoid $L_2$ of a relatively small number of turns. The second solenoid $L_2$ is connected in a circuit which can be traced from the positive terminal of a battery B as the power supply source 40 through a main switch Ms, the pole 35s or rotary switch 42, position 35a or 35b, solenoid $L_2$, a diode $D_1$, transfer switch terminal 36a, 36b or 36c, pole 36s, and release switch 44 to the negative terminal of the battery B. Therefore, so long as the main switch Ms and release switch 44 are closed, second solenoid $L_2$ is energized from battery B. The solenoid control circuit 35 includes an integrating circuit and a trigger circuit responsive to the output of said integrating circuit for energizing and deenergizing the first solenoid $L_1$. The integrating circuit comprises a resistor $R_2$, resistor $R_3$ and a capacitor $C_1$, resistor $R_2$ and capacitor $C_1$ being connected in series with each other and across a resistor $R_1$, and one end of resistor $R_3$ being connected to the junction between resistor $R_2$ and capacitor $C_1$. The trigger circuit comprises a transistor $Tr_1$, a transistor $Tr_2$ and a resistor $R_4$. The transistor $Tr_1$ has a base electrode connected to the other end of resistor $R_3$ of the integrating circuit, a collector electrode connected to one end of the resistor $R_4$ and an emitter electrode connected to the base electrode of transistor $Tr_2$. The transistor $Tr_2$ has an emitter electrode connected through the main switch Ms to the positive terminal of battery B, and has a collector electrode connected to the first solenoid $L_1$ at one terminal thereof, the opposite terminal of which is connected to the negative terminal of battery B through a circuit which can be traced from the collector electrode of transistor $Tr_2$ through first solenoid $L_1$, transfer switch terminal 36a, 36b or 36c, rotary switch pole 36s and release switch 44 to the negative terminal of battery B. With this circuit in block 35, when the release switch 44 is closed, the base potential of transistor $Tr_1$ is dropped to render transistor $Tr_1$ conducting, and the collector potential of transistor $Tr_1$ is also dropped to render transistor $Tr_2$ conducting. As a result, just after the release switch 44 is closed, the first and second solenoids $L_1$ and $L_2$ are energized simultaneously to strongly attract the cam follower lever 31 against the force of spring 34, thereby the lever end 31 is disengaged from either of the notches 21a and 21b with reliability. The integrating circuit is so designed that the period of actuation of first solenoid $L_1$ is long enough to insure that the motor 16 is driven for displacement of the notch 21a or 21b from the alignment with the cam follower lever end 31. During the course of exposure operations subsequent to the actuation period, only the second solenoid $L_2$ is energized. This is advantageous from the battery consumption view point. After the release switch 44 is opened to terminate a series of exposures for motion picture photography with shutter speed of 24 frames/sec., or 18 frames/sec., the second solenoid $L_2$ is continuously energized from battery B through a circuit which can be traced from the positive terminal of battery B, through main switch Ms, rotary switch pole 35s, circuit transfer switch terminal 35a or 35b, solenoid $L_2$, diode $D_1$, switch 26, transfer switch terminal 37a, 37b or 37c, and rotary switch pole 37s to the negative terminal of battery B, until switch 26 is turned off by cam collar 23. When switch 26 is opened, the voltage at the negative pole of condenser $C_1$ is increased to a level equal to the voltage of battery B, thereby transistors $Tr_1$ and $Tr_2$ are rendered non-conducting to deenergize the second solenoid $L_2$.

The motor speed adjusting circuit 38 includes a condenser $C'$ connected across either of two contact-governor type speed detectors 41 to remove noise due to the arc produced by the turning on and off of the detector 41, and a resistor $R'$ connected in parallel with said condenser $C'$ to discharge condenser $C'$. The motor 16 is energized from battery B through a circuit which can be traced from the positive terminal of battery B through main switch Ms, rotary switch pole 38s, circuit transfer switch terminal 38a, 38b, 38c, 38d, 38e or 38f, detector 41, motor control switch 32 and the winding of motor 16 to the negative terminal of battery B.

When the rotary switch 42 is switched to position $c$ for single frame exposure, the second solenoid $L_2$ is cut off from the system. In this case, when the release switch 44 is closed, the first solenoid $L_1$ is energized for a moment to disengage the lever end 31 from the notch 21a and then to close switch 32, whereby motor 16 is driven to rotate control cam disk through complete one cycle of revolution of control cam disk 21 as switch 26 is closed when the next notch 21b comes into the alignment with the lever end 31. As the control cam disk 21 rotates for one cycle of revolution, the shutter is caused to rotate through one revolution at a speed adjusted by circuit 38, thereby only one frame exposure is completed.

The low light level exposure control circuit in block 39 includes a timing circuit containing a resistor $R_5$ and a condenser $C_2$ connected in series with each other. Connected to the junction between resistor $R_5$ and condenser $C_2$ is the base-one of a unijunction transistor $Tr_3$, of which the base-two is connected through a resistor $R_7$, block 36 and release switch 44 to the negative terminal of battery B. The emitter electrode of unijunction transistor $Tr_3$ is connected through a condenser $C_3$ to the negative bus and also through a resistor $R_8$ to the base electrode of a transistor $Tr_4$ having an emitter electrode connected to the negative bus and having a collector electrode connected to the negative pole of condenser $C_1$ of block 35. The base-two of unijunction transistor $Tr_3$ is also connected through a resistor $R_6$, a variable resistor $VR_1$, $VR_2$ or $VR_3$, a circuit transfer switch terminal 39d, 39e, and/or 39f and the rotary switch pole 39s to the collector electrode of transistor $Tr_4$. The circuit in block 39 further includes a diode $D_2$ connected across resistor $R_5$. With this circuit of block 39, when the release switch 44 is closed, a voltage is applied to the timing circuit $R_5$ and $C_2$ through a circuit which can be traced from the positive terminal of battery B through main switch Ms, resistor $R_1$ of block 35, the positive bus of block 39, the negative bus of block 39, transfer switch terminal 36d, 36e or 36f, rotary switch pole 36s, and release switch 44 to the negative terminal of battery B. When the voltage of condenser $C_2$ has reached a reference voltage determined by the voltage divider containing resistor 6, resistor 7 and one of variable resistors $VR_1$, $VR_2$ and $VR_3$, the unijunction transistor $Tr_3$ is rendered conductive which in turn renders transistor $Tr_4$ conductive, thereby the collector potential of transistor $Tr_4$ is dropped with a drop in the potential of the negative pole of condenser $C_1$ of block 35. When the transistors $Tr_1$ and $Tr_2$ are conducting, the first solenoid $L_1$ is instantaneously energized despite of the fact that the switch 25 is in the open position, thereby the lever end 31 is disengaged from the notch 21b, and the shutter is moved from its open position to the closed position to terminate the duration of a time interval, e.g. 15 seconds, 30 seconds, or 60 seconds selected by switching the pole 39s to a position d, e or f respectively. So long as the release switch 44 is closed, the motor 16 further rotates the shutter past the closed position to the open position, thereby the next exposure is initiated.

The diaphragm control circuit in block 45 comprises a bridge circuit containing a photosensitive element 5 in one arm and three groups of resistors, $R_1$, $R_2$ and $R_3$ in other three arms respectively, and a difference amplifier circuit 46 connected between the output terminals of the bridge circuit and having a pair of output terminals connected to driving means such as a galvanometer or servo motor for the lens diaphragm device. The input terminals of the bridge circuit are connected to respective terminals of a constant voltage diode string D which are in turn connected to the positive and negative terminals of battery B. A smoothing condenser C is connected across the diode string D. Of these three resistor groups $R_1$, $R_2$ and $R_3$, the resistor group $R_1$ is provided for selecting shutter speeds in response to operation of the rotary switch 42, the group $R_2$ for selecting types of film, for example, daylight or flashlight film, and the group $R_3$ for selecting film speeds. These resistor groups $R_1$, $R_2$ and $R_3$ are arranged to be set in automatic response to the insertion of a film magazine into the chamber of the camera in a manner known in the art. When the main switch Ms is closed, the D.C. power is fed from the battery B through the diode string D to the bridge circuit and difference amplifier circuit of which the output reversibly drives the meter or servo motor to control the size of the aperture opening of the lens diaphragm 2 in accordance with the shutter speed, film speed, film type and the level of brightness of a scene bring photographed.

Figure 4:
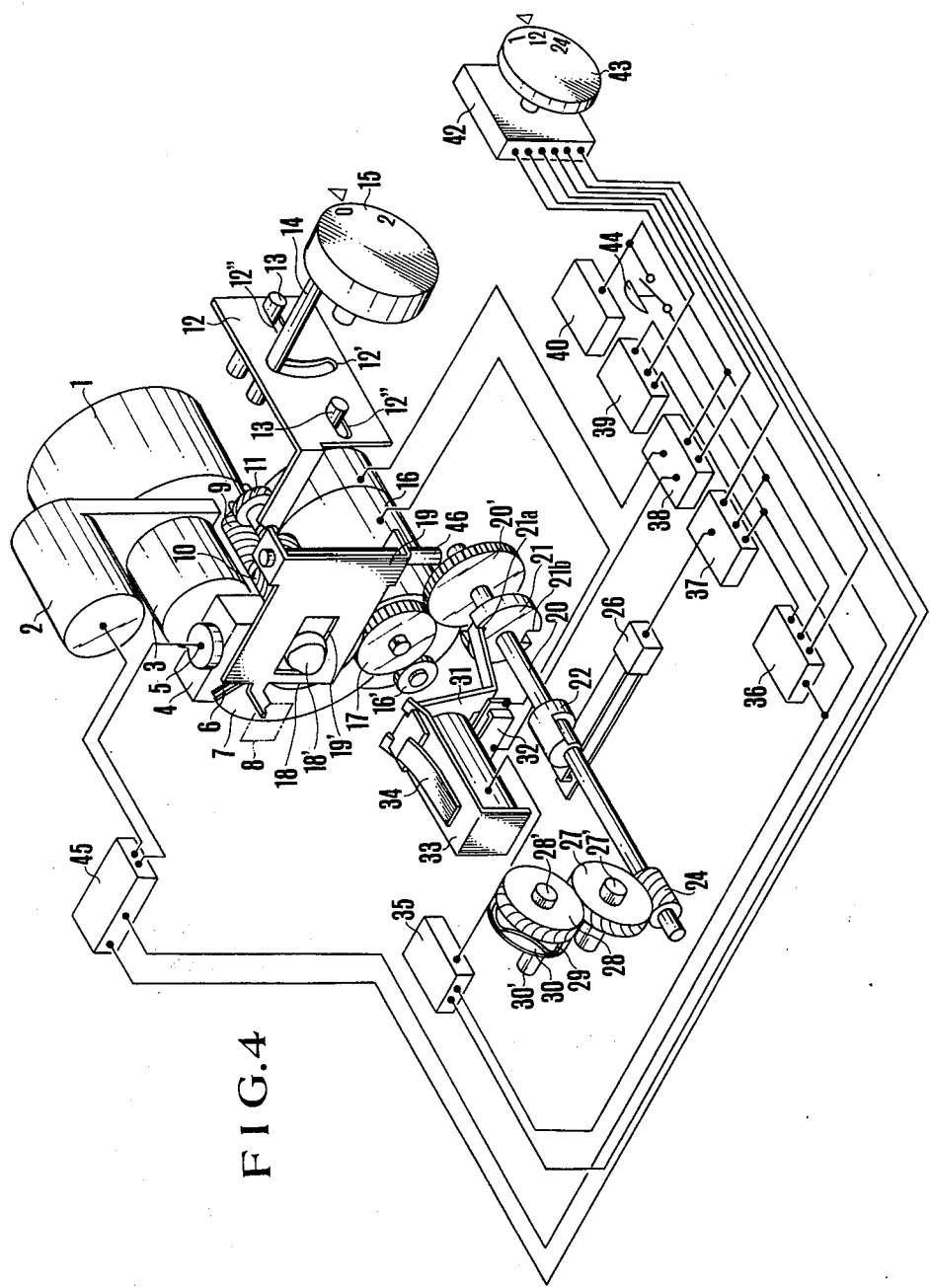
FIG. 4 is an exploded perspective view of a second embodiment of the invention resulted from the motion picture camera of FIG. 1A with slight modification.

FIG. 4 shows an example of modification of the motion picture camera of FIG. 1A, wherein the cam collar 23 and switch 25 cooperating therewith of FIG. 1A are excluded, and the other parts remaind substantially unchanged from the motion picture camera of FIG. 1A. The same reference characters and numerals are employed to denote similar parts to those shown in FIG. 1A. In making exposures at normal light levels, the camera of FIG. 4 operates in a manner similar to that shown in connection with FIGS. 1A, 2 and 3.

The operation of the camera of FIG. 4 in the low light level exposure control mode is as follows. When the rotary switch 42 is set to any one of the positions d, e and f, the switch 26 is cut off from the system. Next, when the shutter release switch 44 is closed, a circuit is established which can be traced from the positive terminal of battery B through main switch Ms, block 35, the positive bus of block 39, the negative bus of block 39, block 36 and release switch 44 to the negative terminal of battery B, thereby the condenser $C_2$ charged through resistor $R_5$. When the voltage of condenser $C_2$ has reached a level dependent upon the circuit parameters of a voltage divider containing resistors $R_6$ and $R_7$ and one of the variable resistors $VR_1$, $VR_2$ and $VR_3$, the unijunction transistor $Tr_3$ is rendered conducting which in turn renders transistor $Tr_4$ conducting causing a potential decrease at the collector electrode of transistor $Tr_4$. This potential decrease causes a decrease in the potential at the base electrode of transistor $Tr_1$ of block 35, thereby transistors $Tr_1$ and $Tr_2$ are rendered conducting to energize the first solenoid $L_1$. The period of actuation of solenoid $L_1$ depends upon the period of conduction of transistor $Tr_4$, as the condenser $C_2$ is discharged. Upon energization of solenoid $L_1$, the lever end 31 is disengaged from the notch 21a, and then the switch 32 is closed to energize motor 16 until the lever end 31 enters into the next notch, namely, notch 21b, thereby an exposure is initiated.

After the discharging of condenser $C_2$ is terminated, the next charging of condenser $C_2$ begins so long as the release switch 44 is closed. When the voltage of condenser $C_2$ has reached the same level as the above, the solenoid $L_1$ is energized in a manner similar to that shown above, thereby the lever end 31 is disengaged from the notch 21b, and the shutter is moved from the open position to the closed position to terminate the exposure. When the lever end 31 has entered the next notch 21a, the motor driving circuit is cut off at the switch 32. So long as the release switch 44 is closed, such a procedure of exposure operation repeats itself to make a number of exposure in sequence.

Figure 5:
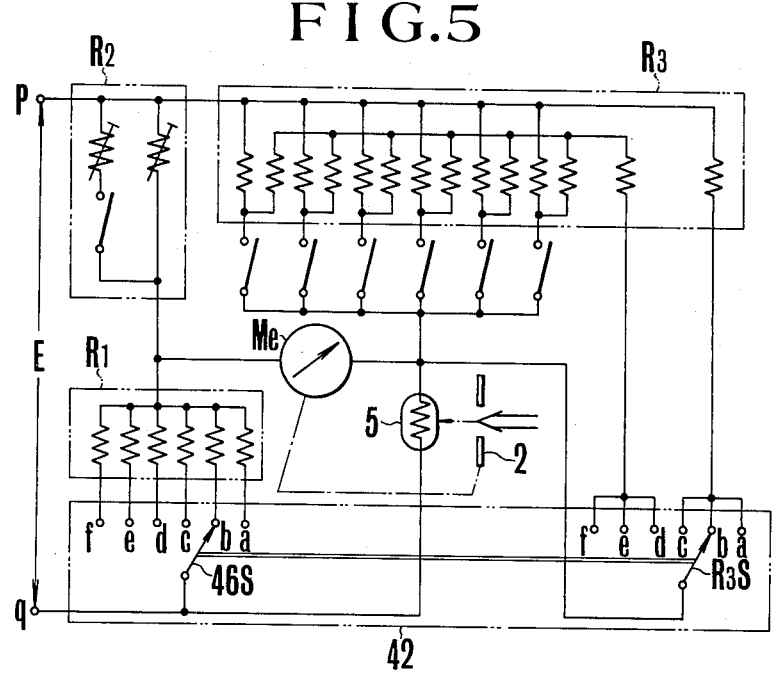
FIGS. 5, 6 and 7 are schematic electrical circuit diagrams showing various modifications of the bridge circuit of FIG. 3 used in the exposure metering device 45 of FIG. 2.

In FIG. 5, there is shown a first example of modification of the bridge circuit of block 45. The bridge circuit has a pair of input terminals p and q between which a voltage E is applied, and has a pair of output terminals between which a meter Me is connected. The diaphragm 2 is connected to the meter Me through mechanical linkage schematically shown by dashed lines. The construction, arrangement and combination of photosensitive element 5 and resistor groups $R_1$ and $R_2$ are identical to those shown in FIG. 3. But the resistor group $R_2$ for selecting film speeds is different in resistor element arrangement and combination from that of FIG. 3, and is shown as having additional six resistor elements connected in parallel with respective resistor elements of FIG. 3 and arranged to be selectively connected to the bridge circuit by means of a circuit transfer switch $R_3S$ associated with the rotary switch 42. The resistance values of the additional resistor elements connected to any one of the transfer switch terminals d, $e$ and $f$ are larger than those of the respectively parallel-connected resistor elements of FIG. 3 connected to any one of the transfer switch terminals $a$, $b$ and $c$, so that the deviation of the resistance value of element 5 from the linear response characteristic is compensated to improve the diaphragm control accuracy.

Figure 6:
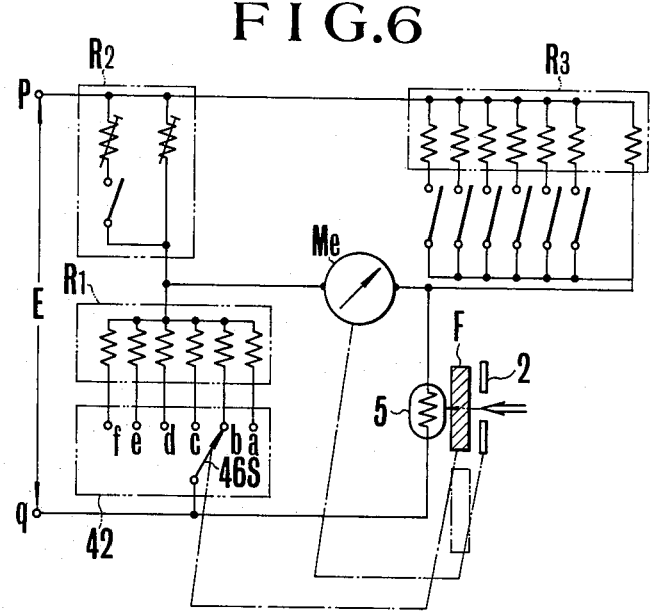

In FIG. 6, there is shown a second example of modification of the bridge circuit of block 45. In order to insure that the dynamic response range of photosensitive element 5 is maintained substantially unchanged between the normal and low light conditions, the photosensitive element 5 is provided with a filter F having a predetermined density arranged to be insertable into and removable from the front thereof in cooperation with the rotary switch 42.

Figure 7:
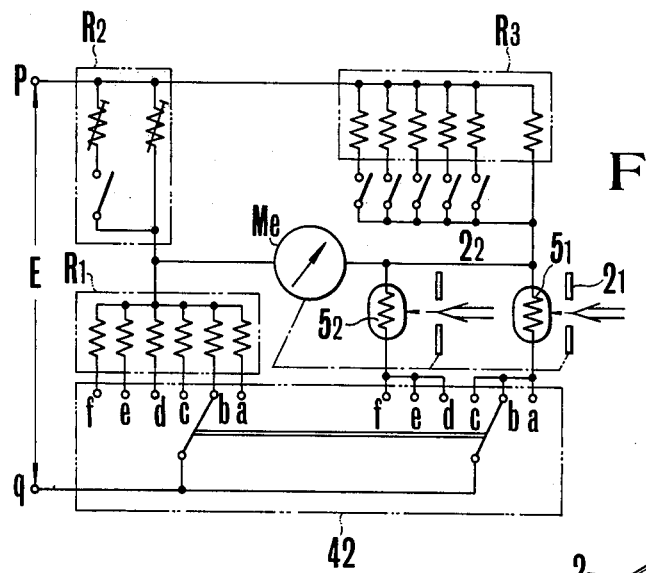

In FIG. 7, there is shown a third example of modification of the bridge circuit of block 45. In order to extend the dynamic response range of the photosensitive element 5, there is provided two photosensitive elements $5_1$ and $5_2$ arranged to be selectively connect to disconnect from the bridge circuit in cooperation with the rotary switch 42. The photosensitive element $5_1$ adapted for use in sensing normal light levels provides a higher resistance value than the element $5_2$ when exposed to an equivalent light condition.

It will be appreciated from the foregoing description that the present invention provides an exposure control apparatus for a motion picture camera having a shutter 6, 7, shutter driving means including motor 16, exposure metering means including a bridge circuit and the lens diaphragm driving means responsive to the output of the exposure metering means for controlling the diaphragm of the camera, which apparatus includes shutter speed setting means 43 having a number of settable positions, some of which are adapted for use in making exposures at normal light levels, and some of which are adapted for use in making exposures at low light levels, shutter drive control means (solenoid control means 35 and electromagnet 33) responsive to the setting of said shutter speed setting means 43 for controlling operation of said shutter driving means, timing means 39 responsive to the setting of shutter speed setting means 43 to low light level exposure control mode for controlling operation of said shutter drive control means, and diaphragm control menas 45 responsive to the setting of said shutter speed setting means for controlling operation of said lens diaphragm driving means, whereby it being made possible to make exposures at low light levels outside the normal light level range in the shutter speed preselection automatic exposure control mode. It is to be noted that the various control means operate with a single camera control device, and such an arrangement and construction is very advantageous from the point of view of preventing a necessary manipulation of the camera from being overlooked.

Figure 8:
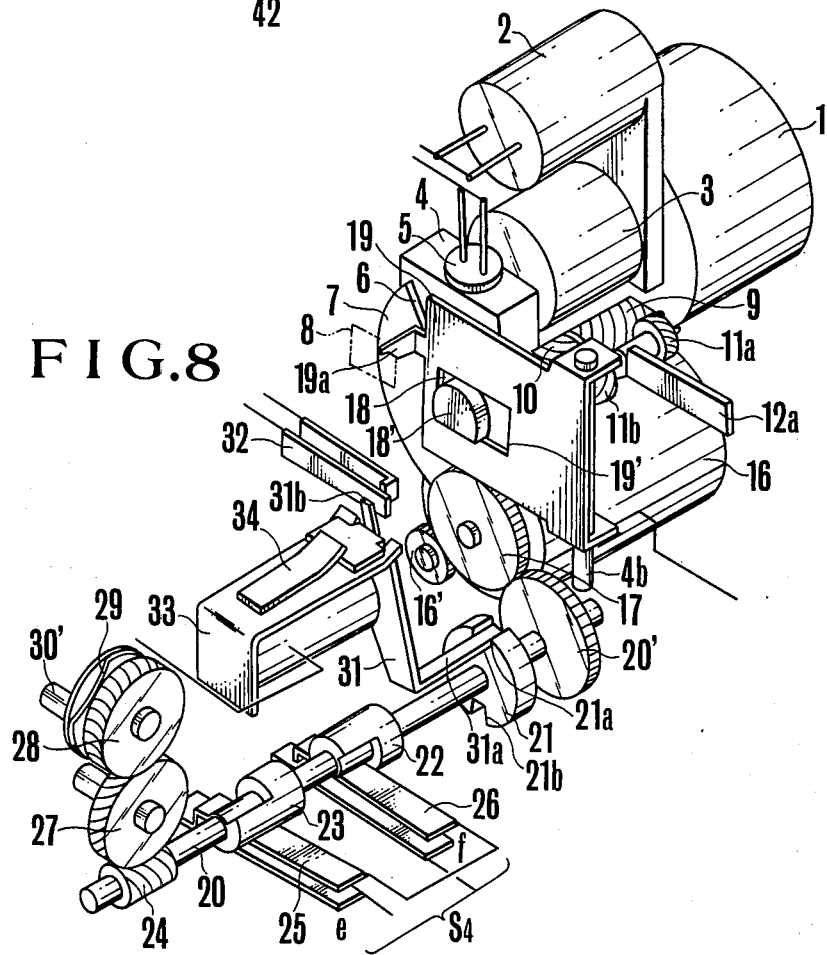
FIG. 8 is an exploded perspective view of the basic parts of a motion picture camera adapted to employ another embodiment of an exposure control system according to the invention as shown in FIG. 9.
Figure 9:
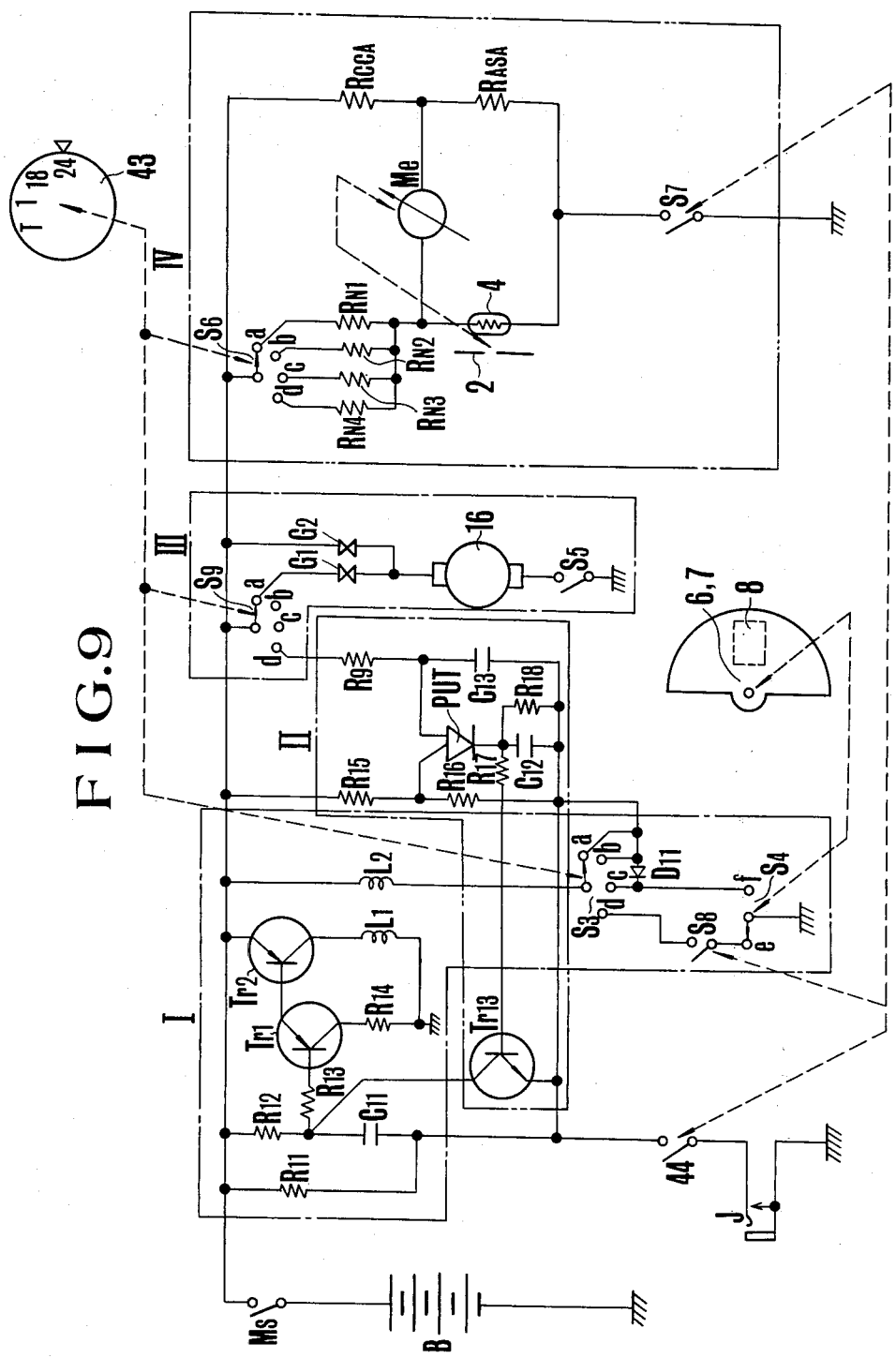
FIG. 9 is a schematic view showing an example of the electrical circuitry of the exposure control system according to a second embodiment of the invention.

Referring now to FIGS. 8 and 9, there is shown another embodiment of an exposure control system according to the present invention as applied to a motion picture camera. As shown in FIG. 8, the motion picture camera essentially comprises an objective lens 1, 3 a motor-operating diaphragm device 2, a beam splitter 4, a photosensitive element 5, shutter blades 6, 7, a film gate 8, shutter driving means including an electric motor 16, a film pull down 19, a motion transmitting shat 20, a film take-up reel driving shaft 30', shutter position control cam disk 21 having two notches 21a and 21b spaced from each other by an angular distance of 180°, a cam follower lever 31 for the cam disk 21, an electromagnet 33 cooperating with the lever 31, said lever 31 having one end arranged to be engageable with either of the notches 21a and 21b and having the opposite end arranged to operate a switch 32, cam collars 22 and 23 fixedly mounted on the shaft 20 and a switch $S_4$ arranged to cooperate with said cam collars 22 and 23 in such a manner that when the film gate is blocked by the shutter blades 6, 7, the switch contact $e$ is closed by cam collar 23, while when the film gate 8 is unblocked, the switch contact $f$ is closed by cam collar 22. The arrangement, construction and combination of these parts are identical to those of the essential parts of FIG. 1A.

In FIG. 9, there is shown the exposure control system for the motion picture camera provided with the shutter preselection automatic exposure control range, as comprising a battery B of which the positive terminal is connected through a main switch M$s$ to the positive bus and of which the negative terminal is grounded, a shutter drive control circuit I, a low light level exposure control circuit II, a motor drive circuit III and a diaphragm control circuit IV, each of which will be described in detail below.

The shutter drive circuit comprises a timing circuit containing a resistor $R_{12}$ and a condenser $C_{11}$ connected in series with each other, a resistor $R_{11}$ connected across the timing circuit $R_{12}$, $C_{11}$, a transistor $Tr_1$ having a base electrode connected through a resistor $R_{13}$ to the junction between resistor $R_{12}$ and condenser $C_{11}$ having a collector electrode connected through a resistor $R_{14}$ to the ground, a transistor $Tr_2$ having a base electrode connected to the emitter electrode of transistor $Tr_1$, having a collector electrode connected through a first or main solenoid $L_1$ to the ground and having an emitter electrode connected to the positive bus, and a second or subordinate solenoid $L_2$ connected between the positive and negative bus through a switch $S_3$ when switch $S_3$ is set in its $a$ or $b$ position corresponding to a shutter speed of 24 frames/sec., or 18 frames/sec. respectively which is selected in cooperation with shutter speed setting dial 43. When switch $S_3$ is set in its $c$ position corresponding to single frame exposure operation at a motor speed of 18 frames/sec. and when the switch $S_4$ is set in its $f$ position where the shutter 6, 7 is opened, the solenoid $L_2$ is grounded. When switch $S_3$ is set in its $d$ position corresponding to a low light level exposure operation with a shutter speed of ½ frame/sec. and the like, when switch $S_4$ is set in its $e$ position where the shutter is closed, and when a switch $S_8$ cooperating with a release switch 44, the solenoid $L_2$ is grounded.

The low light level exposure control circuit II comprises a voltage divider containing a resistors $R_{15}$ and $R_{16}$ connected in series with each other and between the positive and negative buses, a programmable unijunction transistor PUT having a base-one connected to the junction between resistors $R_{15}$ and $R_{16}$, having a base-two connected to the junction of a timing circuit containing a resistor $R_9$ and a condenser $C_{13}$ connected in series with each other and between the positive and negative buses through a switch $S_9$, and an emitter electrode connected both through a resistor 17 to the base electrode of a transistor $Tr_{13}$ and through a resistor $R_{18}$ and a condenser $C_{12}$ to the negative bus, the resistor $R_{18}$ and condenser $C_{12}$ being connected in parallel with each other, and the transistor $Tr_{13}$ having a collector electrode connected to the junction of the timing circuit $R_{12}$, $C_{11}$ and having an emitter electrode connected to the negative bus. The negative bus is connected through the release switch 44 and a remote control jack J to the ground. The release switch 44 is arranged so that a not shown shutter release button is depressed to the second stroke stage, switch 44 is closed.

The motor drive circuit III comprises an electric motor 16, first and second motor speed adjusting mechanical governors $G_1$ and $G_2$ incorporated in the motor 16 and each connected to the winding of motor 16 at one end thereof, the opposite end of which is connected through a switch $S_5$ to the ground. The switch $S_5$ is arranged to be closed when at least one of the solenoids $L_1$ and $L_2$ is energized. The first governor $G_1$ is connected to the positive bus through a switch $S_9$ when switch $S_5$ is set in its $a$ position. The second governor $G_2$ is directly connected to the positive bus.

The diaphragm control circuit IV comprises a bridge circuit having a pair of input terminals one of which is connected to the positive bus and the other of which is connected to the negative bus through a switch $S_7$, said switch $S_7$ being arranged to be closed when the shuter release button is depressed to the first stroke stage, and a pair of output terminals between which a meter $Me$ is connected. The lens diaphragm device 2 is mechanically linked with the needle of meter $Me$. A group of four resistors $RN_1$, $RN_2$, $RN_3$ and $RN_4$ is provided in one arm of the bridge circuit for introducing the selected shutter speed to the light-metering result by means of a switch $S_6$ cooperating with the shutter speed setting dial 43. A photosensitive element 5 is provided in another arm for providing a resistance value proportional to the amount of light passing through the objective lens 1, 3 and the lens aperture opening being controlled. A resistor $R_{ASA}$ is provided in another arm for setting the sensitivity of the used film. A resistor $R_{CCA}$ is provided in the other arm for setting the type of the used film, for example, daylight or artificial light film.

The operation of the system of FIG. 9 will be described below in connection with the motion picture camera of FIG. 8. For motion picture photography, the operator may turn dial 43 to place a desired shutter speed numeral "24" or "18" in registry with a stationary index, thereby switches $S_3$, $S_6$ and $S_9$ are simultaneously set to their $a$ or $b$ position respectively. Next, the main switch $Ms$ is closed and then the not shown shutter release button is depressed to the first stroke stage to close switch $S_7$. At this time, the angular position of the needle of meter $Me$ depends upon the preselected shutter speed, the used film speed and film type as well as upon the light value as sensed by element 5. Upon further depression of the shutter release button to the second stroke stage, the release switch 44 is closed to render transistors $Tr_1$ and $Tr_2$ conducting, thereby the main solenoid $L_1$ is energized. The period of energization of solenoid $L_1$ is equal to the time period for which the condenser $C_{11}$ is charged through resistor $R_{12}$ to a voltage at which the transistor $Tr$ is non-conducting. Upon energization of solenoid $L_1$, the lever end 31a is disengaged from the notch 21a of control cam disk 21, and then switch $S_5$ is closed to energize the motor 16. As the motor 16 rotates, the shutter 6, 7 is rotated to make a series of exposure at a frequency of 24 or 18 frames/sec. Although the main solenoid $L_1$ is deenergized after a very short time interval from the actuation of the shutter release button, the subordinate solenoid $L_2$ is continuously energized so long as switch 44 is closed.

When the release switch 44 is opened at a time the shutter is in the open position where switch $S_4$ is in its $f$ position, the solenoid $L_2$ remains energized, causing rotation of motor 16. But when the shutter is moved to the closed position, switch $S_4$ is set from its $f$ position to its $e$ position where solenoid $L_2$ is deenergized, permitting the lever end 31a to enter the notch 21a under the action of spring 34. Such a movement of lever 31 causes the switch $S_5$ to be turned off to deenergize motor 16. Thus the series of exposures is terminated at the closed position of the shutter.

In order to make a single frame exposure, the dial 43 is turned to place the numeral "1" in registry with the index, thereby switches $S_3$, $S_6$ and $S_9$ are set to their $c$ positions. Next, when the release button is depressed, the first solenoid $L_1$ is instantaneously energized to drive motor 16 for rotation at a speed of 18 frames/sec. When the shutter is moved from the closed position to the open position, the switch $S_4$ is set to its $f$ position where the second solenoid $L_2$ is energized. Next, when the shutter is moved from the closed to open position, the second solenoid $L_2$ is deenergized because of the presence of a diode $D_{11}$ reversely connected between the terminal $c$ of switch $S_3$ and the negative bus despite of the fact that the release switch 44 is closed.

In order to make exposures at low light levels singly or in sequence, the dial 43 is turned to place symbol "T" in registry with the index, thereby switches $S_3$, $S_6$ and $S_9$ are simultaneously set to their $d$ positions. Next, when the shutter release button is depressed to close switch 44, the shutter is moved from the closed position to the open position where the second solenoid $L_2$ is deenergized. Because of the setting of switch $S_9$ in the $d$ position, the condenser $C_{13}$ begins to be charged through resistor $R_{19}$ in synchronism with the closure of switch 44. After the predetermined time interval, the voltage of condenser $C_{13}$ reaches the reference voltage of the voltage divider $R_{15}$ and $R_{16}$, thereupon the unijunction transistor PUT is rendered conducting, which in turn renders transistor $Tr_{13}$ conducting to instantaneously energize the fist solenoid $L_1$. As the motor 16 rotates, the shutter is moved from the open position to the closed position. At this time, if the shutter release button remains depressed, the shutter is further moved from the closed position to the open position, whereby the next exposure is initiated. Such a procedure repeats itself until the release button is returned to the rest position.

When the shutter release button is released to turn off switches 44 and $S_8$, the second solenoid $L_2$ is deenergized provided that the shutter is in the dosed position. If the shutter is in the opened position at the time the shutter release button is released, the condenser $C_{13}$ begins to be discharged through diode $D_{11}$ and switch $S_4$ to the ground after the duration of the predetermined time interval is terminated. After that, the first solenoid $L_1$ is instantaneously energized, causing the shutter to move from the open position to the closed position. At this time, because of the fact that switch $S_8$ is already turned off, the second solenoid $L_2$ is deenergized although the switch $S_4$ is in the $e$ position. Thus the series of exposure is terminated always at the closed position of the shutter.

Instead of the provision of only one shutter speed for the low light level exposure operation, it is possible to provide a number of shutter speeds for the low light level exposure operation by employment of a corresponding number of combinations of resistors of different resistance value as arranged in place of the combination of resistors $RN_4$ and $R_{19}$ respectively.

Moreover, instead of the provision of the shutter preselection automatic exposure control range, it is possible to provide the diaphragm preselection automatic exposure range in the exposure control system of the invention.

It will be appreciated that the second embodiment of the invention adapted to make exposures over an extended range of light levels is applicable to conventional motion picture cameras with slight modification of the shutter and other mechanical parts thereof, because the exposure control is made electrically. This feature of the invention is of particular importance in advancing the camera systematization for increasing the range of photographable situations which might be otherwise encountered by the conventional motion picture camera.

Figure 10:
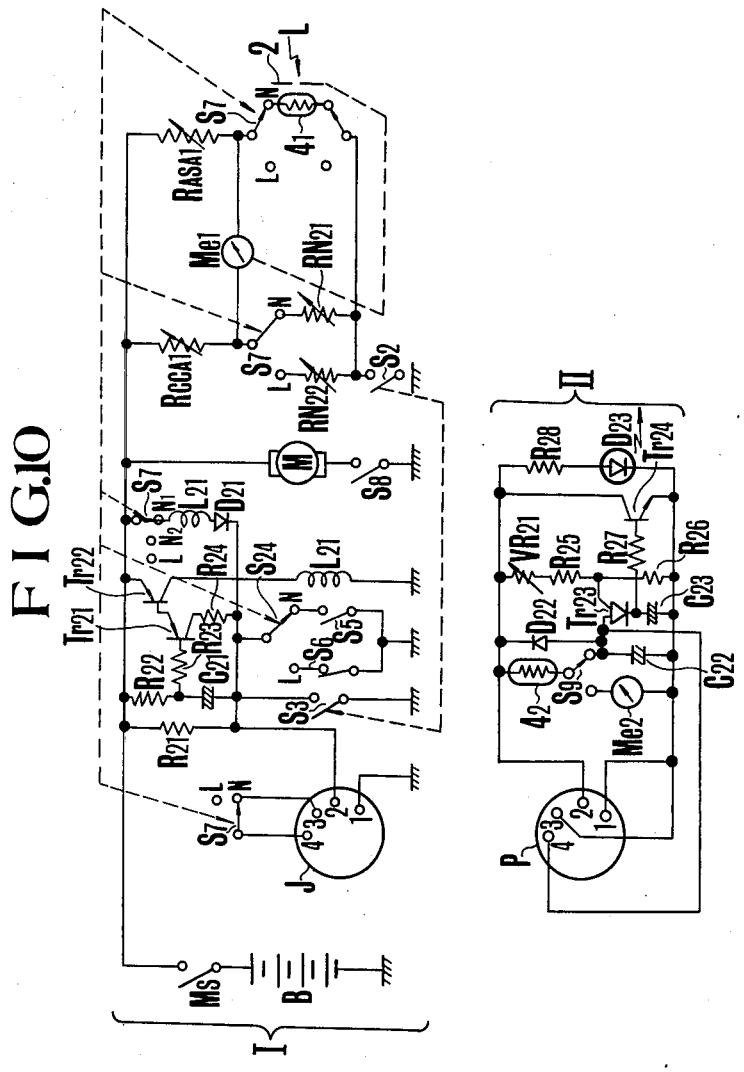
FIG. 10 is a schematic electrical circuit diagram of a low light level exposure control system according to a third embodiment of the invention adapted for camera systematization.

An example of a low light level exposure control system adapted for use in a camera systematization according to the invention is shown in FIG. 10, wherein the low light level exposure control circuit II of FIG. 9 is arranged in separate form from the shutter drive control circuit I, motor drive circuit III and diaphragm control circuit IV, and some slight modifications are made in the low light level exposure control circuit II and the mechanical switch arrangement.

Figure 13:
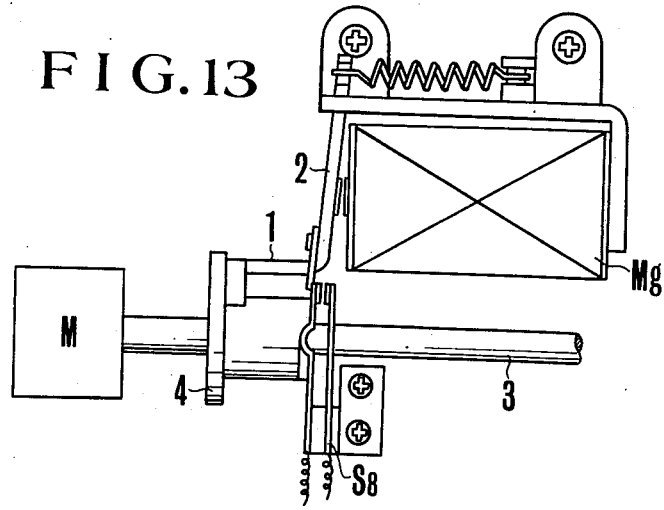
FIG. 13 is an elevational view of an actuating and stopping mechanism for an electric motor usuable in the invention particularly in connection with the system shown in FIGS. 10 and 11.

Switches $S_2$ and $S_3$ of FIG. 10 are arranged to cooperate with a not shown shutter release button and to operate with respect to each other in such a manner that after switch $S_2$ is closed in the first stroke depression of the release button, switch $S_3$ is closed. An exposure control range selecting switch assembly is provided as comprising a switch $S_4$ connected between the negative bus of the circuit section I and the ground through switches $S_5$ and $S_6$, the switch $S_5$ being connected between the terminal N of switch $S_4$ and the ground, and the switch $S_6$ being connected between the terminal L of switch $S_4$ and the ground, three cut-off switches $S_7$ arranged to cut off a light value sensing element $5_1$ and a normal shutter speed control resistor $LN_{21}$ from the system when the camera is switched to the low light level exposure control range, and to cut off the circuit section II corresponding to the low light level exposure control circuit II of FIG. 9 from the system when the camera is switched to the normal light level exposure control range, and a switch $S_7$, connected between the positive bus and the second solenoid $L_{21}$ and having positions $N_1$, $N_2$ and L for adaptation to a particular motion picture shutter speed, a single frame exposure and a particular long exposure time respectively. The switch $S_5$ is arranged to be closed when the shutter is in its open position and to be opened when the shutter is in its closed position. The switch $S_6$ is arranged to operate in reverse relation to switch $S_5$. A switch $S_8$ for controlling operation of an electric motor M is positioned adjacent an armature 52 of an electromagnet Mg as shown in FIG. 13, wherein 51 is a stopper, 53 is an output shaft of the motor M, and 54 is a cam disk mounted on the output shaft 53. The switch $S_8$ is closed when the solenoid of electromagnet Mg is energized. The circuit section II includes a switch $S_9$ arranged to select a timing condenser $C_{22}$ and a meter $Me_2$ for connection with a photosensitive element $5_2$. The meter $Me_2$ functions as an indicator which teaches the operator how long the adjusted shutter speed by the timing circuit is. The positive and negative buses of circuit section II are terminated at a plug P with terminals 1 and 2 respectively. The other two terminals 3 and 4 of the plug P are connected to the negative bus and the base-one of a unijunction transistor $Tr_{23}$ respectively, and are short-circuited when the plug P is connected with a jack J of the circuit section I, and when switch $S_7$ is set in the N position. The positive and negative buses of circuit section I are connected with terminals 1 and 2 of the jack J.

In operating the motion picture camera employing the system section I of FIG. 10 in the normal light level exposure control range, the exposure control range selecting switch assembly is switched to the position N, $N_1$. The power or main switch $Ms$ is closed, and then the shutter release button is depressed to the first stroke stage to close switch $S_2$, whereby the bridge circuit containing film type setting variable resistor $R_{CCA1}$, film speed setting variable resistor $R_{ASA}$, shutter speed setting variable resistor $RN_{21}$ and the light-value sensing element $t_1$ is rendered operative to control the size of the aperture opening of the lens diaphragm device 2 in cooperation with the needle of an exposure meter $Me_1$ connected between the output terminals of the bridge circuit. Upon depression of the shutter release button to the second stroke stage, switch $S_3$ is closed to energize the first solenoid $L_1$ in a manner similar to that shown in connection with FIG. 9 and also the second solenoid $L_2$, thereby the armature 52 of FIG. 13 is attracted by the electromagnet Mg against the force of a spring. As the armature 52 is moved toward the electromagnet Mg, the stopper 51 is disengaged from the control cam disk 54, and then switch $S_8$ is closed to energize motor M. After a very short time interval from the closure of switch $S_3$, the first solenoid $L_{21}$ is deenergized, but the second solenoid $L_{22}$ is continuously energized to maintain the closure of switch $S_8$. As the motor M rotates, the shutter operates to make a series of exposures with a shutter speed of 18 frames/sec. for example.

When the shutter release switch $S_3$ is opened, and when the shutter moves to the closed position wherein switch $S_5$ is open, the second solenoid $L_{22}$ is deenergized, permitting the stopper to engage the cam disk 54, thereby the switch $S_8$ is turned off to deenergize the motor M, and the series of exposures is terminated.

For making a single frame exposure, the switch $S_{7'}$ is turned to the $N_2$ position, and then the shutter release button is depressed. In this case, the second solenoid $L_{22}$ is not energized. The instantaneous energization of the first solenoid $L_{21}$ causes only one revolution of the shutter in cooperation with switches $S_5$ and $S_8$.

For making exposures at low light levels singly or in sequence, the circuit section II is brought by the operator into connection with the circuit section I at the plug and jack assembly. When the switch $S_2$ is closed by means of an EE lock button not shown which is accessible from the camera housing, and then the switch assembly $S_7$ is set to the L position, a current flows through the switches $S_4$ and $S_6$ to the ground, thereby the switching transistors $Tr_{21}$ and $Tr_{22}$ are rendered conducting to energize the first solenoid $L_{21}$. As the motor M is driven for a very short period, the shutter is moved from the closed position to the open position. Because of the disconnection of the photosensitive element $5_1$ from the bridge circuit, the meter $Me_1$ assumes a position for the fully opening of the lens diaphragm. In a time interval dependent upon the level of brightness of an object being photographed as sensed by the photosensitive element $5_2$ of circuit section II from the closure of switch assembly $S_7$, the timing condenser $C_{22}$ is charged to a voltage equal to the reference voltage determined by the voltage divider containing a variable resistor $VR_{21}$ and resistors $R_{25}$ and $R_{26}$, thereupon the unijunction transistor $Tr_{23}$ is rendered conducting to produce a trigger pulse which is applied to the base electrode of a transistor $Tr_{24}$, whereby the light-emitting diode $D_{23}$ is quenched, indicating the termination of an exposure. On the other hand, upon conduction of transistor $Tr_{24}$, the switching transistors $Tr_{21}$ and $Tr_{22}$ are again rendered conducting to energize the first solenoid $L_{21}$, whereby the shutter is moved from the open position past the closed position again to the open position to initiate the next exposure.

Figure 11:
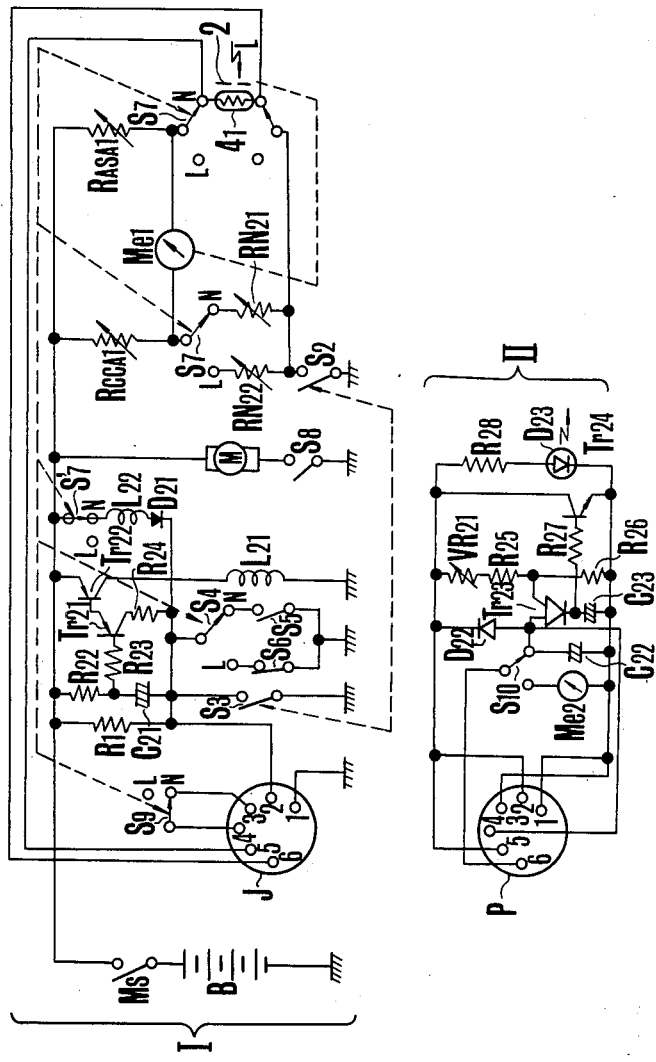
FIGS. 11 and 12 are schematic electrical circuit diagrams showing two examples of modification of the low light level exposure control system of FIG. 10.

FIG. 11 shows an example of modification of the exposure control system of FIG. 10, wherein the second photosensitive element $5_2$ of FIG. 10 is excluded, and instead the first photosensitive element $5_1$ is utilized to form a timing circuit of the second circuit section II. The other parts of the system of FIG. 11 remain unchanged from the system of FIG. 10.

Figure 12:
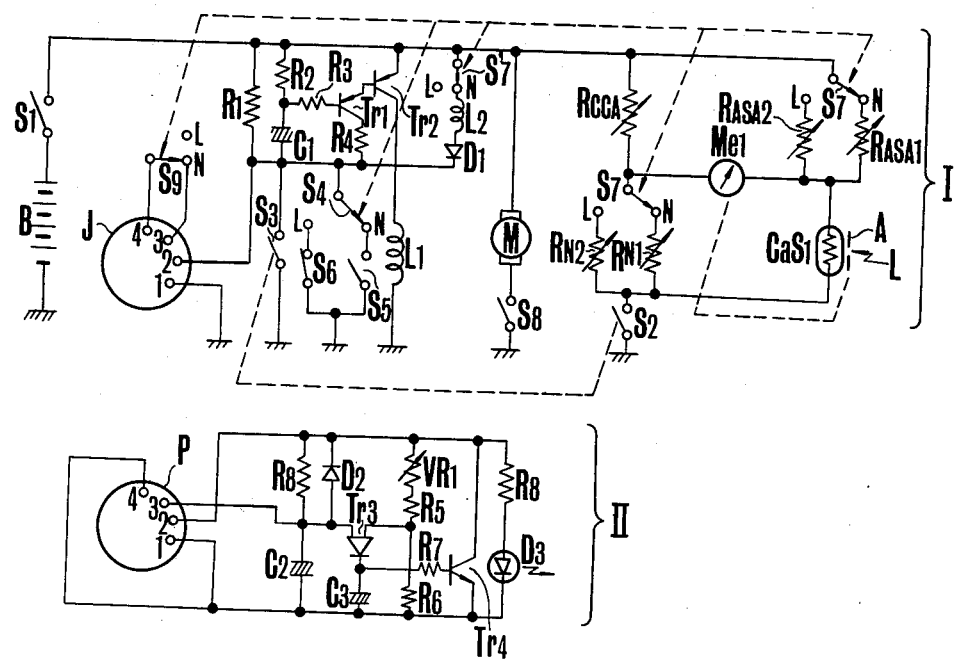

FIG. 12 shows another example of modification of the exposure control system of FIG. 10. While the exposure control systems of FIGS. 10 and 11 is incapable upon selection of the low light exposure control range, of controlling the diaphragm of the camera, the system of FIG. 12 is adapted to control the size of the aperture opening of the camera diaphragm in accordance with the level of brightness of object being photographed even when the system is set in the low light level exposure control range. For this purpose, there is provided a compensating variable resistor $R_{ASA_2}$ in addition to the variable resistor $R_{ASA_1}$ of FIG. 10 or FIG. 11. The function of these variable resistors $R_{ASA_1}$ and $R_{ASA_2}$ is similar to that of the resistor group $R_3$ of FIG. 5. There is also provided a fixed resistor $R_{28}$ in place of the second photosensitive element $5_2$ for providing a constant shutter speed in making exposures at low light levels.

The operation of the system of FIG. 12 in the normal light level exposure control range is similar to that of the system of FIG. 10. In the case of the low light level exposure control range, the operation is as follows. The jack J of the first circuit section I of the motion picture camera is brought into connection with the plug P of the second circuit section II. When the switch $S_2$ is closed by an EE lock button, and the switch $S_4$ is set by a changeover switch not shown to the L position where the switches $S_7$ and $S_{7'}$ are set in the L positions, a current flows through switch $S_4$ and switch $S_6$ to the ground, whereby the switching transistors $Tr_{21}$ and $Tr_{22}$ are rendered conducting to energize the first solenoid $L_{21}$. As the motor M is driven for a short period, the shutter is moved from the closed position to the open position to initiate an exposure. On the other hand, upon setting of the switch $S_7$ from the N position to the L position, the timing condenser $C_2$ of the circuit section II begins to be charged through the resistor $R_{28}$. In a time interval determined by the timing circuit containing condenser 22 and resistor $R_{28}$, the unijunction transistor $Tr_{23}$ is rendered conducting to produce a trigger pulse which is then applied to the transistor $Tr_{24}$. Upon conduction of transistor $Tr_{24}$, the potential at the terminal 2 of the jack J drops to almost zero, causing the conducting of the switching transistors $Tr_{21}$ and $Tr_{22}$, which in turn causes instantaneous energization of the first solenoid $L_{21}$. As the motor is rotated, the shutter is moved from the open position past the closed position to the open position to initiate the next exposure. During the exposure operation, the size of the aperture opening of the camera diaphragm is controlled in accordance with the shutter speed set in the variable resistor $RN_{22}$ and the light value as photoelectrically sensed.

The light-emitting diode $D_{23}$ is quenched when the shutter is actuated for exposure.

It will be seen from the foregoing description that the embodiments of the present invention accomplish the above mentioned objects by providing electrical control means for controlling operation of the shutter and diaphragm mechanisms of the camera in combination with a low light level exposure control circuit, enabling the camera to make exposures over a remarkably extended range of photographic light situations which may be encountered.

What is claimd is:

1. A motion picture camera, comprising:
   a. photographic optical system,
   b. exposure adjusting means having:
      an exposure correction circuit having a photoelectric conversion means to generate an electric signal corresponding to the amount of light passing through the photographic optical system, said circuit producing a signal corresponding to the output of said photoelectric conversion means, and
      a diaphragm aperture means coupled to said circuit to control the amount of light passing through said photographic optical system corresponding to the output of said exposure correction circuit,
   c. a rotary shutter,
   d. driving means coupled to the shutter to revolve said shutter, repeatedly past the optical system,
   e. switching means coupled to said driving means to control the driving and the stopping of said driving means,
   f. stopper means rotatable in cooperation with the rotation of the shutter, wherein said stopper means has a first stopper to help the shutter to be stopped at a position to allow passage of light, and a second stopper means to help the shutter to be stopped at a light blocking position to block the passage of light,
   g. release means having:
      blocking means coupled to said switching means and shiftable to an engaging position at which it engages the stopper means and forcibly stops the revolution of the shutter and at the same time retains the switching means in an open state, and to a non-engaging position which allows rotation of the shutter and retains the switching means in a closed state, and
      electromagent means coupled to said blocking means to control said shifting of the blocking means,
   h. control means to control said electromagnet means, and having:
      signal generating means responsive to control from without the camera and coupled to said electromagnet means to generate an electric signal for controlling the magnetization of the electro-magnet means,
      first shutter position detection means coupled to said signal generating means and responsive to the shifting of the shutter to said exposure position to stop the generating of the signal from the signal generating means which causes said blocking means and said first stopper means to engage each other, said detection means having a timer circuit coupled to said signal generating means to again cause the generation of said signal by the signal generating means after a lapse of a prescribed period of time, and photographic mode selector means switchable between an ordinary photographic mode to photograph by continuously revolving the shutter and a long time photographing mode to stop the shutter temporarily at said exposure position and expose for a long period of time, said selector means nullifying said shutter position detection means at a time of ordinary photographing, and i. timer means to set the time of said timer circuit, said timer means being electrically connected to said timer circuit and said exposure correction circuit and controlling said timer circuit and the correction of said exposure correction circuit during the setting operation.

2. A camera according to claim 1, in which said exposure correction circuit includes a bridge circuit having four branches, said photoelectric conversion means including a photoelectric conversion element connected in one of said branches, another of said branches including variable resistance means having a resistance value variable in cooperation with the setting of said timer means.

3. A camera according to claim 1, in which said timer circuit includes an RC time constant circuit.

4. A camera according to claim 3, in which said RC time constant circuit includes a variable resistance to vary time constant in an association with the handling of the setting operation member of said timer means.

5. A motion picture camera, comprising:
a. rotary shutter,
b. driving means to revolve said rotary shutter,
c. openable and closable switching means for driving and stopping said driving means,
d. stopper means rotatable in coaction with the shutter, said stopper means having a first stopper which constrains said shutter to stop at an exposure position to allow passage of object light and a second stopper for constraining the shutter to stop at a light blocking position to block passage of object light,
e. trigger means operable from outside of the camera for controlling the actuation and stopping of said camera,
f. a release means controlled by said trigger means, having:
blocking means shiftable between an engagement position in which said blocking means can engage said stopper means and forcibly stop the revolution of the shutter and at the same time can keep said switching means open, and a non-engagement position which allows the revolution of the shutter and at the same time can keep said switching means closed,
biasing means to continuously bias said blocking means toward said engagement position, and
electromagnet means which when magnetized shifts the blocking means to said non-engaging position in opposition to the biasing power of said biasing means,
g. control means to control said electromagnet means, having:
power supply means to supply magnetizing current to said electro-magnet means in coaction with said trigger means,
first shutter position detection means to detect shifting of said shutter to an exposure position and disable said power supply means for coupling said blocking means with said first stopper, resetting means for reenabling said power supply means after a lapse of a prescribed period of time,
second shutter position detection means for detecting the shift of said shutter to a light blocking position and disabling power supply means and engaging said blocking means with said second stopper engaged; and
mode selector means switchable between an ordinary motion picture photographic mode in which the shutter is continuously revolved, a single frame photographic mode in which said shutter is stopped at a light blocking position every time the shutter revolves once, and a long exposure photographic mode in which the shutter is temporarily stopped at an exposure position having said mode selection means;
a mode selector member,
a regulator means coupled to said first and second shutter position detector means and coactive with said mode selector member, and h. timer means coupled to said resetting means for setting a reset period for said resetting means; said regulator means, when said selector means is switched to the ordinary photographic mode by said mode selector member, nullifying the operation of said first and second shutter position detection means during the operation of the trigger means, and rendering said second shutter position detection means operable effectively only when the operation of the trigger means is completed; said regulator means when switched to the single frame mode nullifying the effect of said first shutter position detection means only while said trigger means is operating; said regulator means when switched to a long exposure mode nullifying the effect of said second shutter position detection means during the operation of the trigger means and actuating said second shutter position detection means when the operation of said trigger is completed.

6. A camera according to claim 5, in which said release means includes cam means coupled to said blocking means for causing said blocking means to keep said switching means closed until said blocking means is about to engage either one of said first or second stopper of the stopper means.

7. A camera according to claim 5, in which said control means includes a delay circuit coupled to said power supply means which keeps said power supply means actuated for a period of time to allow said shutter to make substantially a complete revolution even after the operation of said trigger means is completed during ordinary motion picture photography and during single frame photography and includes a retention circuit coupled to said power supply means which retains said power supply means in an operative state after the operation of said trigger means is completed at least until the operation of said resetting means is completed during long exposure photography.

8. A motion picture camera, comprising:
a. a photographic optical system,
b. exposure adjusting means, including
an exposure correction circuit having a photoelectric conversion means to generate an electric signal corresponding to the amount of object light passing through the photographic optical system, said circuit producing a signal corresponding to the output of said photoelectric conversion means, and diaphragm means responsive to the output of said exposure correction circuit and for controlling the amount of light passing through said photographic optical system, c. a rotary shutter,
d. driving means to revolve said shutter,
e. switching means to drive and stop said driving means,
f. stopper means rotatable with said shutter and having a first stopper for holding said shutter at a position which passes object light and second stopper means for holding of said shutter at a light blocking position in which it blocks light from the optical system,
g. a trigger operable from outside of the camera,
h. release means controlled by said trigger, and having:
  blocking means shiftable to an engaging position in which said blocking means engages said stopper means to forcibly stop the revolution of said shutter and at the same time to keep said switching means open, and to a nonengaging position in which said blocking means allows revolution of said shutter and at the same time closes said switching means,
  biasing means for continuously biasing said blocking means into the engaging position, and
  electromagnet means which, when magnetized, shifts said blocking means to said nonengaging position against the biasing force of said biasing means,
i. regulator means to control said electromagnet means and having:
  power supply means to supply magnetizing current to said electromagnet means in response to said trigger means,
  first shutter position detection means to detect shifting of said shutter to said exposure position for interrupting the supply of energy from said power supply means and to engage said blocking means with said first stopper means,
  resetting means to recontinue the energy supply from said power supply means, which has been stopped to said first shutter position detection means, after a lapse of a prescribed period of time,
  second shutter position detection means to detect the shifting of said shutter to said light blocking position for interrupting the supply of energy from said power supply means and engage said blocking means with said second stopper means engage and
  mode selector means settable to an ordinary photographic mode for continuously revolving said shutter and a single photographic mode for stopping said shutter at the light blocking position during as well as to a long exposure photographic mode for temporarily stopping said shutter at said exposure position, said selector means including:
    a mode selector member, and
    control means actuated in coaction with said mode selector member, and
j. timer means electrically connected to said resetting means and said exposure correction circuit for setting the period of time required for resetting of said resetting means, and for controlling said resetting means and correcting said exposure correction circuit;
  said control means, when said mode selector member is set to the ordinary photographic mode, nullifying said first and second shutter position detection means while said trigger means is in operation and effectively actuating the second shutter position detection means only when the operation of the trigger means is completed; said control means, when said mode selector member is set to the single frame mode, nullifying the first shutter position detection means only while the trigger means is in operation; said control means when said selection member is set to the long exposure mode, nullifying the second shutter position detection means while the trigger means is in operation and actuating said second shutter position detection means when the operation of the trigger means is completed.

9. A camera according to claim 8, in which said release means includes cam means for causing said blocking means to retain said switching means in a closed state until said blocking means is about to engage one of said first and second stoppers of the stopper means.

10. A camera according to claim 8, in which said control means includes a delay circuit to maintain operation of said power supply for a period of time sufficient to allow said shutter almost to complete one revolution even after the operation of said trigger means is completed during operation in the ordinary and single frame modes, and includes a retention circuit to retain said power supply means in an operative state at least until the operation of said resetting means is completed after the completion of said trigger means during the long exposure mode.

11. A camera according to claim 8, in which said exposure correction circuit includes a bridge circuit, said bridge circuit having a plurality of branches, a photoelectric conversion element forming a part of said photoelectric conversion means and being connected as one of said branches, said bridge circuit having variable resistance means variable in cooperation with the setting of said timer means and connected in another of the branches of said bridge circuit.

* * * * *